(12) United States Patent
Liu et al.

(10) Patent No.: US 8,523,592 B1
(45) Date of Patent: Sep. 3, 2013

(54) ELECTRICAL CONNECTOR

(75) Inventors: Jun Liu, Guangzhou (CN); Yong Quan Wu, Guangzhou (CN)

(73) Assignee: Lotes Co., Ltd., Keelung (TW)

( * ) Notice: Subject to any disclaimer, the term of this patent is extended or adjusted under 35 U.S.C. 154(b) by 3 days.

(21) Appl. No.: 13/477,201

(22) Filed: May 22, 2012

(30) Foreign Application Priority Data

Mar. 6, 2012 (CN) ...................... 2012 2 0080560 U

(51) Int. Cl.
*H01R 13/62* (2006.01)
(52) U.S. Cl.
USPC .......................................... 439/331; 439/326
(58) Field of Classification Search
USPC .......................................... 439/131, 326, 136
See application file for complete search history.

(56) References Cited

U.S. PATENT DOCUMENTS

| | | | | |
|---|---|---|---|---|
| 4,692,790 A | * | 9/1987 | Oyamada | 439/331 |
| 5,597,316 A | * | 1/1997 | David et al. | 439/159 |
| 5,793,607 A | * | 8/1998 | Karidis et al. | 361/679.38 |
| 5,890,920 A | * | 4/1999 | David et al. | 439/159 |
| 5,967,810 A | * | 10/1999 | Spickler et al. | 439/159 |
| 7,309,245 B2 | * | 12/2007 | Sadatoku et al. | 439/159 |
| 7,357,655 B1 | * | 4/2008 | Van der Steen | 439/188 |
| 7,537,470 B2 | * | 5/2009 | Yamaguchi | 439/159 |
| 7,699,661 B2 | * | 4/2010 | Wu | 439/630 |
| 7,866,988 B2 | * | 1/2011 | Shimada | 439/76.1 |
| 8,113,861 B2 | * | 2/2012 | Shen et al. | 439/326 |
| 2010/0167592 A1 | * | 7/2010 | Shimada | 439/629 |

* cited by examiner

*Primary Examiner* — Briggitte R Hammond
(74) *Attorney, Agent, or Firm* — Morris Manning & Martin LLP; Tim Tingkang Xia, Esq.

(57) ABSTRACT

An electrical connector includes a base, a cover and at least one elastic member. The base is disposed with at least one fastening portion and at least one pivoting portion. The cover covers on the base, disposed with at least one locking portion correspondingly locking the fastening portion, and capable of being opened or closed relative to the base about the pivoting portion. The at least one elastic member press against the base. When the locking portion unlocks the fastening portion, the elastic member pops up automatically due to elasticity, so that an operating space is formed below the cover to allow an operator to open the cover with fingers, which facilitates operation and does not cause injuries of the fingers, thereby ensuring safe use.

10 Claims, 5 Drawing Sheets

ELECTRICAL CONNECTOR

CROSS-REFERENCE TO RELATED APPLICATION

This non-provisional application claims priority under 35 U.S.C. §119(a) on Patent Application No. 201220080560.9 filed in P.R. China on Mar. 6, 2012, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to an electrical connector, and more particularly to an electronic card connector having a cover capable of popping up automatically.

BACKGROUND OF THE INVENTION

Currently in the industry, a common electronic card connector is soldered on a circuit board, and includes an insulating body, a plurality of terminals disposed within the insulating body, and a cover horizontally covering on the insulating body. Two sides of the insulating body are disposed with two fastening portions and a pivoting portion respectively. The cover is capable of being opened or closed relative to the insulating body about the pivoting portion. Two sides of the cover are correspondingly disposed with two locking portions locking the fastening portions and a sliding slot sliding along the pivoting portion respectively. Before the electronic card is inserted into the insulating body, the operator needs to open the cover with hands, place the electronic card, and then push the cover backward, so that the locking portion locks the fastening portion. When the electronic card needs to be taken out, the cover is pushed forward, so that the locking portion unlocks the fastening portion, and at this time, the operator also needs to open the cover, and then take out the electronic card.

As electronic products develop towards light weight, small and thin structures, the electronic card connector has a small structure, a small distance exists between the cover and the circuit board, so that the operator when intending to open the cover has to put fingers between the cover and the circuit board and apply a force to open the cover, which is inconvenient and easily causes injuries of the fingers during operation.

Therefore, a heretofore unaddressed need exists in the art to address the aforementioned deficiencies and inadequacies.

SUMMARY OF THE INVENTION

In one aspect, the present invention is directed to an electrical connector, which is easy to operate and safe in operation.

In one embodiment, an electrical connector includes: a base, disposed with at least one fastening portion and at least one pivoting portion, a cover, covering on the base, disposed with at least one locking portion correspondingly locking the fastening portion, and capable of being opened or closed relative to the base about the pivoting portion, and at least one elastic member, pressing against the base, in which when the locking portion unlocks the fastening portion, the elastic member pops up automatically due to elasticity, so that an operating space is formed below the cover to allow an operator to open the cover.

As compared with the related art, the present invention, among other things, has the following beneficial effects.

The elastic member presses against the base, and when the locking portion unlocks the fastening portion, the elastic member pops up automatically due to elasticity, so that an operating space is formed below the cover to allow an operator to open the cover with hands, which facilitates operation and does not cause injuries of the fingers, thereby ensuring safe use.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
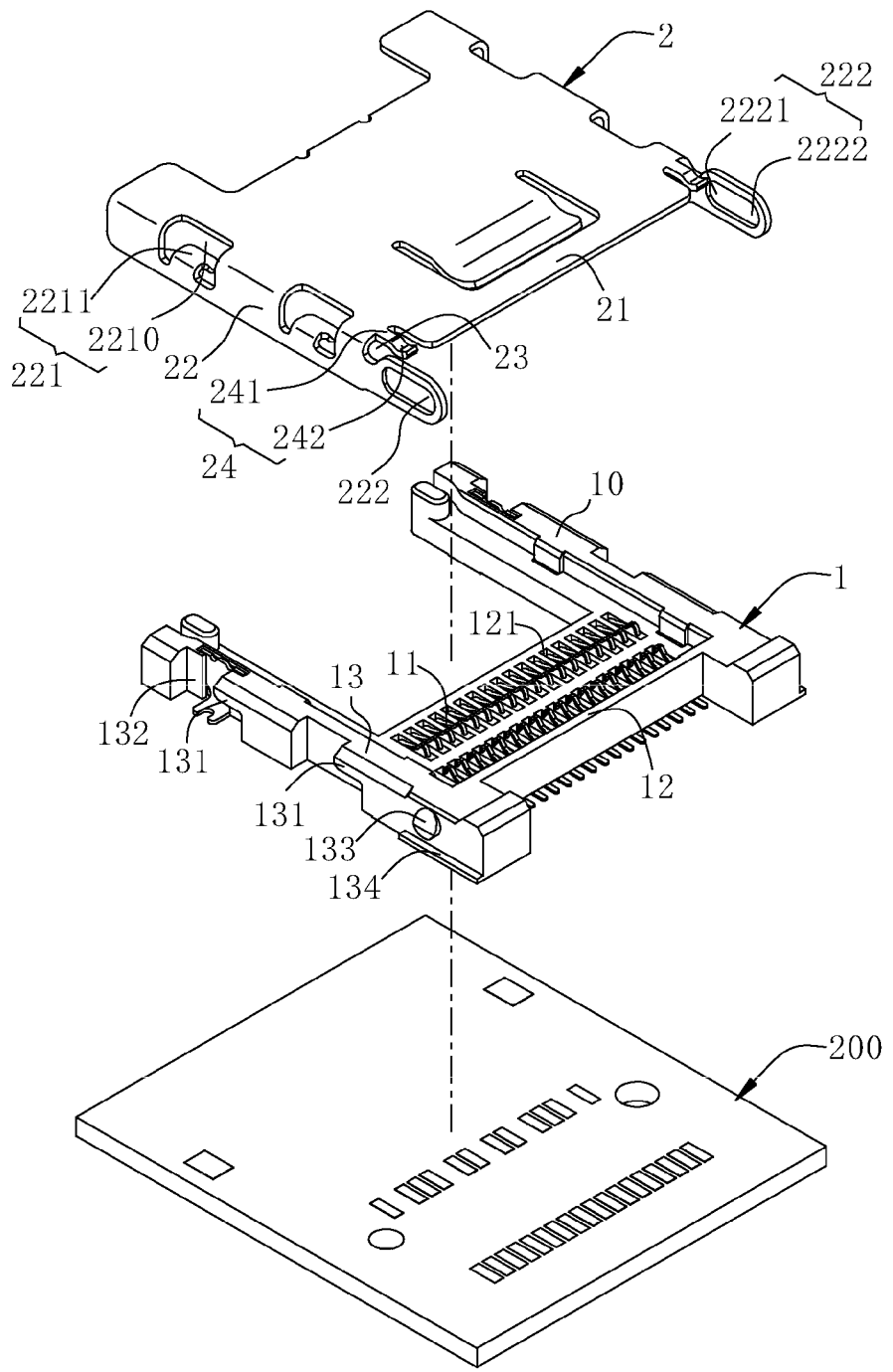
FIG. 1 is schematic a three-dimensional exploded view of an electrical connector according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

Referring to FIG. 1, an electrical connector 100 of the present invention includes a base 1 and a cover 2 that covers on the base 1.

The base 1 includes an insulating body 10 and a plurality of terminals 11 disposed within the insulating body 10. The insulating body 10 has a middle part 12 and two side arms 13 located at two sides of the middle part 12. The middle part 12 is disposed with a plurality of receiving slots 121. Each of the side arms 13 is disposed with two fastening portions 131. The fastening portion 131 is a step-like projecting portion. In other embodiments, each of the side arms 13 may be disposed with a fastening portion 131 located at the front end of the side arm 13, and the fastening portion 131 may be configured in other shapes. Each of the side arms 13 is disposed with a reserved slot 132 adjacent to the fastening portion 131, and a pivoting portion 133 disposed at a rear end of the side arm 13. The pivoting portion 133 is a pivot shaft protruding from the side arm 13. A protruding block 134 is disposed below the pivoting portion 133, and the protruding block 134 is strip-shaped. The terminals 11 are disposed in two rows, and are correspondingly received in the receiving slots 121.

The cover 2 is pivotally disposed on the insulating body 10, and includes a body portion 21, two side portions 22 located at two sides of the body portion 21, and a recess 23 located between the side portion 22 and the body portion 21. The recess 23 is disposed at a rear end of the side portion 22. Each of the side portions 22 is disposed with two locking portions 221 corresponding to the fastening portions 131, and a sliding slot 222 corresponding to the pivoting portion 133. The locking portion 221 includes a notch 2210 formed from the cover 2 and a flat portion 2211 located within the notch 2210. During locking, the fastening portion 131 enters the notch 2210 and is fastened by the flat portion 2211 so as to lock the cover 2 to the base 1. The pivoting portion 133 is engaged with the sliding slot 222, and the sliding slot 222 is capable of displacing relative to the pivoting portion 133 in a front-to-rear direction, so as to drive the cover 2 to slide relative to the base 1 in the front-to-rear direction, thereby achieving locking and opening of the cover 2 to and from the base 1. The sliding slot 222 is an elongated slot, and has a front end 2221 and a rear end 2222. When the cover 2 slides backward so that the pivoting portion 133 is located at the front end 2221, the locking portion 221 locks the fastening portion 131, and the cover 2 is locked. When the cover 2 slides forward so that the pivoting portion 133 is located at the rear end 2222, the locking portion 221 unlocks the fastening portion 131, that is, the locking portion 221 is located within the reserved slot 132. At this time, an edge of the cover 2 presses against the protruding block 134, to prevent the sliding slot 222 from sliding relative to the pivoting portion 133, so that the cover 2 can be rotated stably about the pivoting portion 133 to be opened. As such, locking and opening of the cover 2 can be achieved.

Two elastic members 24 are disposed on the cover 2, and press against the insulating body 10. The elastic members 24 are disposed symmetrically about a longitudinal central line of the cover 2, and are adjacent to the pivoting portions 133 respectively, so that the elastic members 24 applies an even pressing force on the insulating body 10. In this embodiment, the elastic member 24 is an elastic piece integrally formed from the cover 2. In another embodiment, the elastic member 24 is formed by slitting the cover 2. In other embodiments, the elastic member 24 may be assembled to the cover 2, or may be configured in other shapes, in which the shapes that can be easily manufactured are preferred. The elastic member 24 is disposed within the recess 23, and extends backward from an edge of the recess 23. When the operator opens the cover 2, a certain distance is maintained between the elastic member 24 and a surface of the insulating body 10, so that the cover 2 can be easily opened by the operator without being pressed by the elastic member 24. The elastic member 24 includes a connecting portion 241 connected to the cover 2 and a bent portion 242 bent and extending from the connecting portion 241 toward the insulating body 10, and the bent portion 242 is capable of pressing against the surface of the insulating body 10, so as to provide good elasticity.

Figure 2:
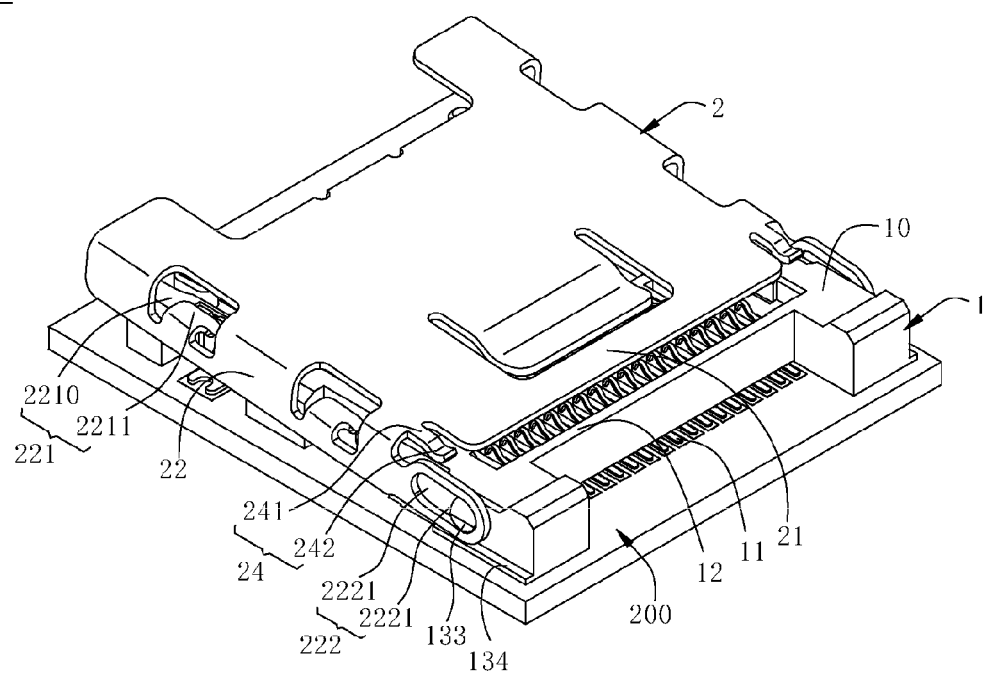
FIG. 2 is a schematic three-dimensional assembled view of the electrical connector according to one embodiment of the present invention.
Figure 3:
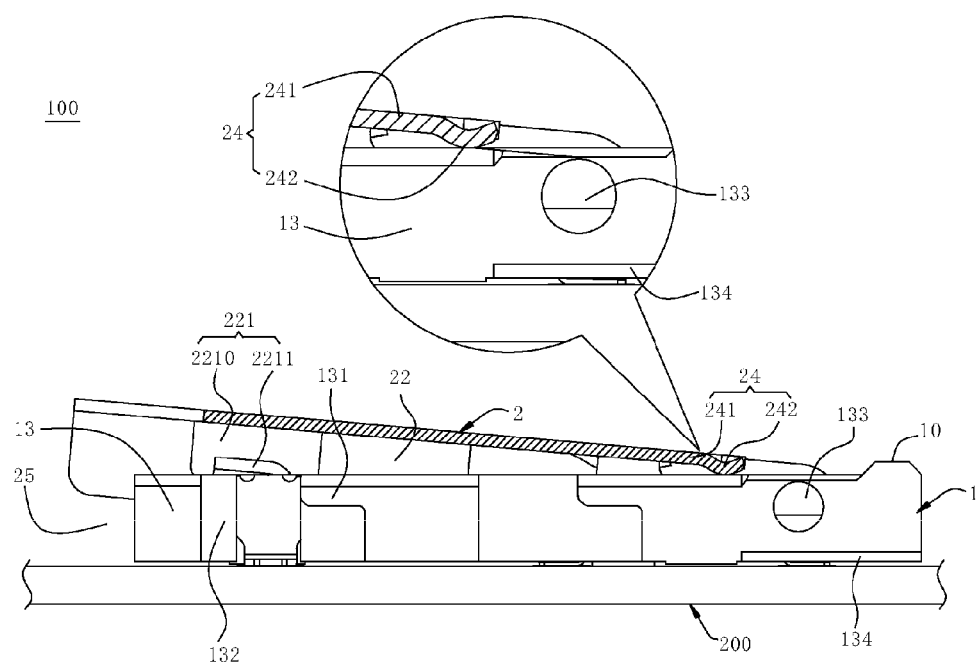
FIG. 3 is a schematic side view of the electrical connector according to one embodiment of the present invention when the cover is in a free state.
Figure 4:
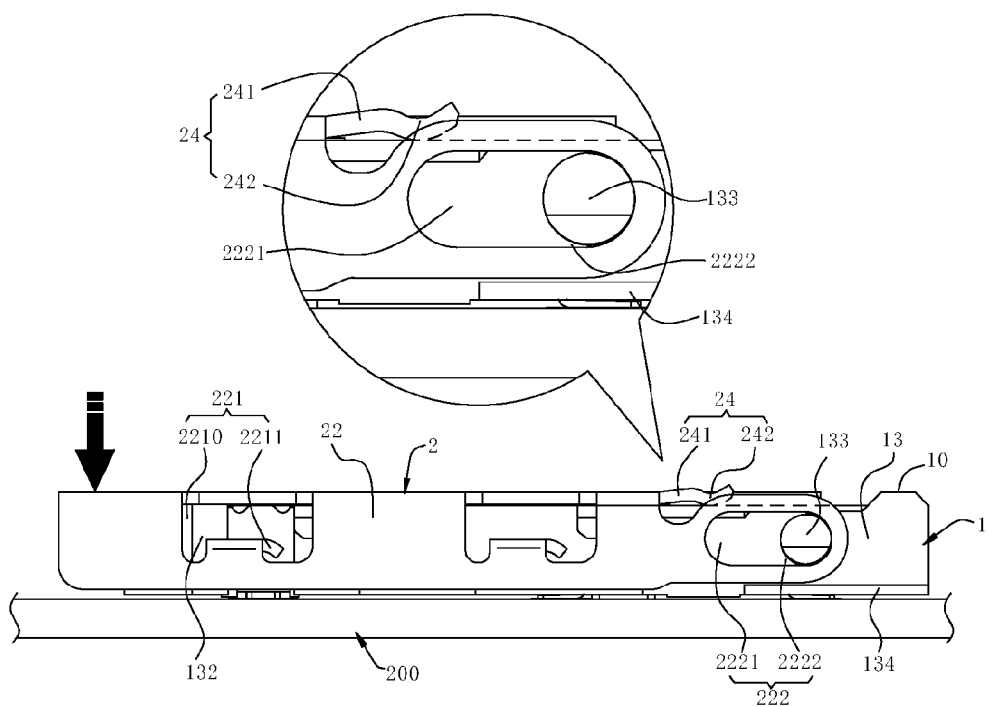
FIG. 4 is a schematic side view of the electrical connector according to one embodiment of the present invention when the cover is pressed.
Figure 5:
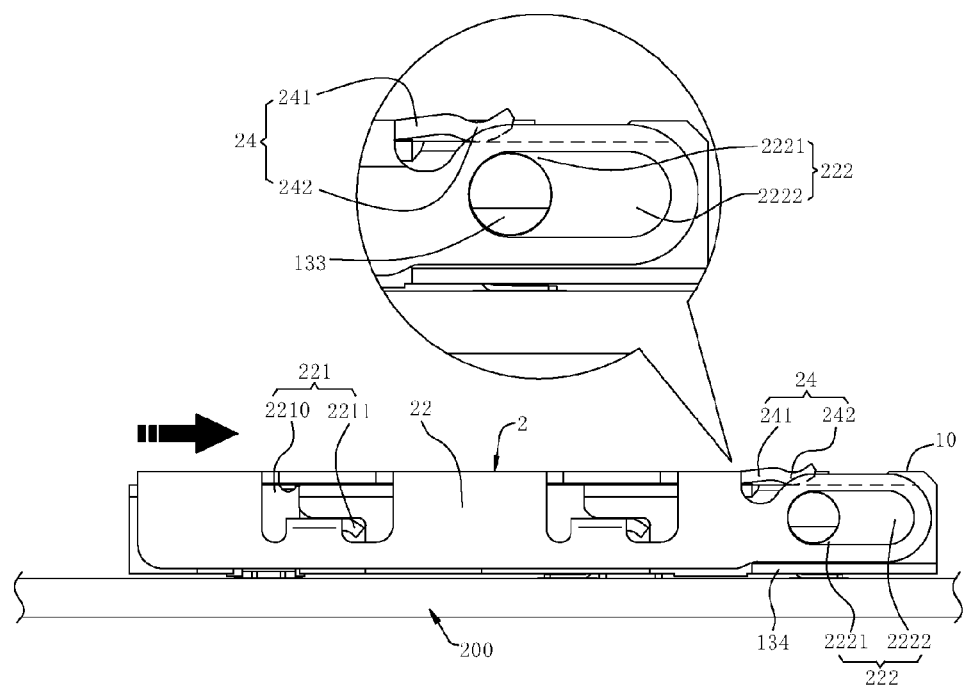
FIG. 5 is a schematic side view of the electrical connector according to one embodiment of the present invention when the cover is locked.

Referring to FIG. 2, the electrical connector 100 is soldered to a circuit board 200, and is used for inserting a mating element (not shown) therein from front to back to be electrically connected to the terminals 11. An operating method for inserting and removing the mating element into and from the electrical connector 100 is as follows. Referring now to FIGS. 3-5, when the mating element is not inserted into the electrical connector 100, the cover 2 is in a free state, and the elastic member 24 presses against the surface of the insulating body 10, to prevent the cover 2 from rotating relative to the base 1. At this time, the pivoting portion 133 is maintained at the rear end 2222, and the edge of the cover 2 presses against the protruding block 134, to prevent the cover 2 from sliding relative to the base 1, so that the cover 2 is in an inclined state, and an operating space 25 is formed below the cover 2 to allow the operator to open the cover 2 with fingers, thereby facilitating operation. After the mating element is inserted into the electrical connector 100, the cover 2 is pressed to rotate to a horizontal state, and the elastic member 24 presses against the surface of the insulating body 10 with a larger pressing force, so that the elastic member 24 is interfered with the insulating body 10, and pushes the cover 2 to slide backward, until the pivoting portion 133 is located at the front end 2221. At this time, the locking portion 221 locks the fastening portion 131, so that the cover 2 is maintained in a horizontally locked state.

Further referring to FIGS. 3-5, when the mating element needs to be taken out from the electrical connector 100, the cover 2 is pushed to slide forward, so that the locking portion 221 moves from the fastening portion 131 to the reserved slot 132, and the locking portion 221 unlocks the fastening portion 131. At this time, the pivoting portion 133 moves to the rear end 2222. Since the elastic member 24 is interfered with and presses against the surface of the insulating body 10 with a large pressing force, once the cover 2 is released, the cover 2 springs back upward due to a counteraction force to the pressing force, so that the cover 2 pops up automatically, and the operating space 25 is formed below the cover 2 to allow the operator to open the cover 2 with fingers, and take out the mating element. After popping up, the cover 2 is in the free state, and the elastic member 24 presses against the surface of the insulating body 10. At this time, the edge of the cover 2 presses against the protruding block 134, so that the cover 2 is maintained in the inclined state, facilitating insertion of the mating element next time.

Based on the above, the electrical connector 100 of the present invention, among other things, has the following beneficial effects.

(1) The elastic member 24 presses against the surface of the insulating body 10, and when the locking portion 221 unlocks the fastening portion 131, the elastic member 24 pops up automatically due to elasticity, so that the operating space 25 is formed below the cover 2 to allow the operator to open the cover 2 with hands, which facilitates operation and does not cause injuries of the fingers.

(2) The cover 2 in the free state can be maintained inclined due to the pressing force of the elastic member 24, so that the cover 2 can be directly opened with fingers during insertion of the mating element, thereby facilitating operation.

(3) When the operator opens the cover 2, a certain distance is maintained between the elastic member 24 and the surface of the insulating body 10, so that the cover 2 can be easily opened by the operator without the elastic member 24 pressing against the surface of the insulating body 10.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:
a base, disposed with at least one fastening portion and at least one pivoting portion;
a cover, covering on the base, disposed with at least one locking portion correspondingly locking the fastening portion, and capable of being opened or closed relative to the base about the pivoting portion; and
at least one elastic member, pressing against the base, wherein when the locking portion unlocks the fastening portion, the elastic member pops up automatically due to elasticity, so that an operating space is formed below the cover to allow an operator to open the cover.

2. The electrical connector according to claim 1, wherein the elastic member is integrally formed from the cover.

3. The electrical connector according to claim 1, wherein there are two elastic members which are disposed symmetrically.

4. The electrical connector according to claim 1, wherein the elastic member comprises a connecting portion connected to the cover and a bent portion bent and extending from the connecting portion toward the base, and the bent portion presses against the base.

5. The electrical connector according to claim 1, wherein the cover is disposed with at least one sliding slot, the pivoting portion is engaged with the sliding slot, and a relative displacement exists between the sliding slot and the pivoting portion, so that the cover slides relative to the base.

6. The electrical connector according to claim 5, wherein the sliding slot has a front end and a rear end, when the locking portion locks the fastening portion, the pivoting portion is located at the front end, and when the locking portion unlocks the fastening portion, the pivoting portion is located at the rear end.

7. The electrical connector according to claim 1, wherein the cover comprises a body portion, each of two sides of the body portion is disposed with a recess respectively, and the elastic member extends from an edge of the recess.

8. The electrical connector according to claim 7, wherein when the operator opens the cover, a distance is maintained between the elastic member and the base.

9. The electrical connector according to claim 1, wherein a protruding block is disposed below the pivoting portion, and an edge of the cover presses against the protruding block.

10. The electrical connector according to claim 1, wherein the elastic member is adjacent to the pivoting portion.

* * * * *